United States Patent
Gandon et al.

[15] 3,660,020
[45] May 2, 1972

[54] PROCESS FOR THE SEPARATION OF IMPURITIES FROM NICKEL CHLORIDE SOLUTIONS

[72] Inventors: Louis Gandon; Christian Bozec; Philippe Lenoble, all of Le Havre, France

[73] Assignee: Le Nickel, Paris, France

[22] Filed: Aug. 7, 1970

[21] Appl. No.: 62,190

[30] Foreign Application Priority Data

Aug. 12, 1969 France................................6922701

[52] U.S. Cl. ...........................23/87 R, 23/50 R, 75/101, 75/119
[51] Int. Cl........................................................C01g 53/08
[58] Field of Search..........................23/50, 87; 75/119, 101

[56] References Cited

UNITED STATES PATENTS 3,507,645  4/1970  Spitzer et al. .........................23/50 R
3,251,646  5/1966  Alon et al.............................23/50 R
3,380,801  4/1968  Williams et al........................23/50 R
3,055,754  9/1962  Fletcher ............................23/50 R UX Primary Examiner—Herbert T. Carter
Attorney—Oberlin, Maky, Donnelly & Renner

[57] ABSTRACT

A process for the separation of metallic impurities, from aqueous nickel chloride solutions by selective liquid/liquid extraction between said aqueous phase containing the said metallic impurities in chloride form and an organic phase containing a trialkyl sulfonium chloride in the form of a solution in an organic diluent substantially immiscible with water, such that at least one of the said metallic valuables is selectively transferred from the aqueous phase to the organic phase, characterized by the fact that the said aqueous phase is substantially neutral and that it presents a total concentration in chloride ions equal at least to 7 gram equivalents/liter.

8 Claims, No Drawings

PROCESS FOR THE SEPARATION OF IMPURITIES FROM NICKEL CHLORIDE SOLUTIONS

The invention is concerned with the separation of metallic impurities contained in aqueous nickel chloride solutions.

The term "metallic impurities" embraces all of the metallic elements, and in particular metal salts and the ions, complex or not, from which they are derived, which are generally usually contained in industrial nickel chloride solutions.

The present invention is concerned in particular with the separation of cobalt and iron from industrial nickel chloride solutions resulting from industrial processes for the production of nickel.

The elimination of iron and cobalt generally contained in industrially obtained nickel chloride solutions is already known. The oldest technique consists in precipitating the iron and cobalt in the form of their trivalent oxides after oxidation of the chloride solutions under controlled conditions of pH. Other more recent methods make use of solid anion exchangers such as anion exchange resins, or liquid ion exchangers such as long chain tertiary amines or quaternary amines; in the case of liquid exchangers, the process employs a liquid/liquid extraction, the active agent being itself diluted in a solvent having little or no miscibility with water, adapted to absorb the complex and maintain it in stable form. There has also been proposed exchangers of mineral ions, such as titanium phosphates but the latter have the inconvenience of hydrolysing too easily.

All the aforesaid processes have defects which make their industrial application either laborious or subject to risks. Indeed in the oldest technique employing the precipitation of iron and cobalt by oxidation by means of chlorine, ozone, or hypochlorites considerable difficulties are met, notably the filtration of the hydroxides which are generally precipitated in colloidal form and the entrainment of substantial quantities of nickel which are adsorbed by these precipitates.

In the case of material acting as an ion exchanger, when it is concerned with anion resins of the quaternary ammonium-polystyrene type, as for example "AMBERLITE IRA 400," or liquid amines such as "ALAMINE 336" or "ALIQUAT 336 5," one proceeds, for the formation of complex chloride amions of cobalt and iron, with the massive addition of a chlorinating agent, generally free hydrochloric acid, which leads to considerable technical difficulties in putting the process into practice. Moreover, the separated solution of nickel chloride is loaded with hydrochloric acid which is practically impossible to eliminate. In addition to the technical difficulties which would be encountered in transporting such acid solutions, it is impossible to use them as such for the recovery of nickel by known methods like electrolysis with insoluble anodes or reduction by hydrogenation under pressure. However, it is clear that, without these drawbacks, the separation by liquid/liquid extraction would present marked advantages due to the facility of carrying out the process and the possibility of conducting the purification operations in a continuous and controllable manner. Indeed, metallic elements capable of forming chloride complexes, for example cobalt, can be extracted selectively from an aqueous phase to an organic phase containing a complexing agent and then recovered separately by washing this organic phase with water. After this extraction, the aqueous phase contains the nickel in chloride form, and in its nickel concentration does not change notably during the extraction operation.

The applicants have found that it is possible to form complexes in the organic phase without the presence of hydrochloric acid in the aqueous phase by using sufficiently concentrated neutral chloride salt solutions. Indeed, the applicants have established that, when the concentration of chlorine ions in the aqueous phase reaches a sufficient value, above 7 gram equivalents/liter, it is no longer necessary to provide, in the form of hydrochloride acid, complementary chlorine ions to facilitate the passage of the chlorocobaltic or chloroferric complexes to the organic phase.

It is besides, known to use sulfonium salts as complexing agents for the separation of metallic valuables in an aqueous solution. With this known technique, the aqueous phase to be purified must be strongly acid. For example, for the separation of nickel from cobalt in an aqueous solution of their chlorides, the aqueous phase must contain 200 to 400 grams of free HCl per liter of solution; due to this fact the solution to be treated cannot be very concentrated in salts of nickel and cobalt.

Further, according to the known technique, it is necessary in order to optimize the effect of the complexing agent, to dilute the sulfonium salt in a polar organic solvent, for example a chloride of an aliphatic hydrocarbon having at least one mobile hydrogen atom. This type of solvent is not always suitable for the organic phase of extraction, notably in the case where it is desired to treat an aqueous phase of high density.

The applicants have found that the organic solvent can advantageously be a relatively light solvent, containing no chlorine atoms and showing little or no solubility in water, for example an ester, an ether oxide or a ketone of low molecular weight. Moreover, the combined effect of this type of solvent and a suitable concentration of complexing agent to form the organic extracting phase results in a considerable diminishing in losses of complexing agent in the course of the extraction operation.

It is thus established that it is possible to use sulfonium salts for the separation of cobalt from nickel, and cobalt contained in concentrated aqueous chloride solution, practically in the absence of free acid, and by using a solvent capable of ensuring a good separation between the aqueous and organic phases and a convenient rate of extraction with a minimum loss of complexing agent.

The complexing agent is an alkyl sulfonium chloride with the general formula

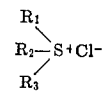

in which $R_1$ is a $CH_3$ radical, and $R_2$ and $R_3$ are alkyl radicals having seven to 13 atoms of carbon. Preferably the complexing agent is a di-sec ($C_8$ to $C_{10}$, alkyl) - methyl-sulfonium chloride and more particularly di-sec-decyl-methyl sulfonium chloride.

The complexing agent is dissolved in an organic solvent slightly or not at all miscible with water, preferably an alcohol ester with a molecular weight less than butyl, amyl and hexyl acetates and propionates, i.e., less than 10 carbon atoms, or a ketone such as methyl-isopropyl ketone, methyl-isobutyl ketone and di-isobutyl ketone, or an ether oxide such as butyl oxide, or a mixture of other organic solvents with one of the aforesaid solvents. Halogen-containing solvents such as 1, 2-dichloroethane, chloroform, trichloroethylene, bromoform, dichlorobenzene, are however, equally suitable.

Aqueous solutions to be treated will generally be provided from one of the stages of nickel production process. These are, for example, concentrated chloride solutions obtained by dissolving, with hydrochloric acid, by-products resulting from the preferential elimination of cobalt from nickel solutions, either by oxidation, or by sulfuration, or solutions resulting from the dissolving in water of chlorides having served to wash a nickel matte during the treatment called "Chloridizing Fusion." Such solutions can also result from the attack by chlorine or hydrochloric acid on any nickeliferous material such as used catalysts ores and alloys containing both nickel and cobalt.

In the process according to the invention, the aqueous phase constituted by the chloride salt solution is contacted with mechanical agitation, with an organic phase containing the complexing agent and the solvent, which is preferably butyl acetate, for less than 5 minutes and in a volumetric ratio $$\frac{\text{organic phase}}{\text{aqueous phase}}$$

between one-half and ten, and preferably between one and three. The mixture is then allowed to rest and, after decemtation, the two phases are separated. The organic phase containing cobalt chloride is washed by a second aqueous phase, containing water possibly acidified, in a volumetric ratio $$\frac{\text{organic phase}}{\text{second aqueous phase}}$$

between one and forty, this operation giving a regenerated organic phase and a cobalt-iron aqueous phase more concentrated in cobalt chloride as the volumetric ratio $$\frac{\text{organic phase}}{\text{water}}$$

is greater during washing. The organic phase thus regenerated can be used again for a new extraction. The cobalt-iron aqueous phase can equally well be used again for another washing operation of the organic phase to the amount of a concentration of cobalt chloride of the order of 130 g. of $CoCl_2$ per liter. These operations are preferably carried out at ambient temperature, although both higher or lower temperatures are equally suitable.

The abovedescribed treatment is the simplest way of carrying out the process according to the invention, but it can, of course, and without departing from the scope of the invention be carried out with modifications as for example the realization of a counter-current treatment in contacting apparatus such as packing columns, rotary disc columns, pulsating columns, multi-stage centrifugal extractors, compartmented apparatus of the type "MIXER SETTLER," or multiple hydrocyclones.

Preferably the process according to the invention is applied to the treatment of chloride solutions obtained from processes for producing nickel, these solutions containing nickel and cobalt in a weight ratio between six and one-half, but the technique can equally well and advantageously be extended to the purification of solutions of nickel chloride much less concentrated in cobalt, containing, for example, 40 parts by weight of nickel to 1 part by weight of cobalt.

The concentration of the complexing agent organic phase can vary between 0.2 and 1 mole/liter, but it is preferably between 0.3 and 0.5 moles/liter, taking into account the fact that with low concentrations the selectivity with respect to the chlorinated complex is higher but entails a considerable loss of complexing agent, while at higher concentrations, the selectivity is less but entails smaller losses.

The process according to the present invention will be better understood by the following examples given solely by way of illustration.

EXAMPLE 1

Influence of the solvent

A substantially neutral chloride solution containing 152 g./l. of Ni and 25.2 g./l. of Co, having a concentration of chlorine ions of 6 gram equivalents/liter and a weight ratio Ni/Co of about 6, has been obtained by dissolving in hydrochloric acid a sludge obtained from the selective oxidation of cobalt by sodium hypochlorite during the treatment of a sulfate solution with impure nickel resulting from the reaction of sulfuric acid with nickeliferous wastes rich in cobalt.

In the course of a series of comparative experiments, 500 ml of this solution are each time placed in contact, in a decanting vessel, with a liter of a solution containing 0.3 mole of di-sec-decyl-methyl-sulfonium chloride in one of the following solvents:

1, 2 - dichloroethane, trichloroethylene, bromoform, 1, 2 - dichlorobenzene, butyl acetate, and a mixture of 75 percent trichloroethylene and 25 percent bromoform. After mechanical agitation for 1 minute it is left to decant. The times for decanting and clarification of the phases are noted and the phases are then separated. The organic phase is washed by 500 ml of acidified water and the degree of separation is determined by analysis of the aqueous phase after this operation. The losses of active material by entrainment in the aqueous phases are evaluated by the amount of sulfonium compound before and after the extraction operation. The results obtained are set out in Table I hereunder, in which the capacity of extraction of the sulfonium compound is expressed in grams of cobalt recovered to 1 kilogram of raw active material supplied to a concentration of 2 equivalents per kilogram.

TABLE I

| Solvent | Duration of decanting of phases (minutes) | Selectivity of passage of metals into the organic phase weight of cobalt/ weight of nickel | Capacity of extraction (g. of Co to kg. of active material) | Losses (kg. of active material to kg. of Co extracted) |
|---|---|---|---|---|
| 1,2-dichloroethane | 10 | >1,000 | 48 | 3.0 |
| Trichloethylene | 7 | 8 | 40 | 2.0 |
| Bromoform | 3 | >1,000 | 37 | 2.5 |
| 1,2-dichlorobenzene | 12 | 12 | 48 | 1.0 |
| Trichloroethylene plus bromoform 75:25 by volume | 3 | >1,000 | 40 | 1.5 |
| Butylacetate | 3 | 3 | 38 | <0.1 |

As shown in Table I the nature of the solvent influences not only the selectivity but also the losses of complexing agent and the decanting times. It can be seen that butyl acetate while not leading to an excellant selectivity with respect to cobalt permits on the contrary a considerable reduction in the losses and gives a particularly rapid and efficient separation of the phases.

Of course, it is clear that with an extraction in several stages and in counter-current, this selectivity would be distinctly improved. Further, as will appear in the following description, the conditions of the aforesaid experiments are not optimal as regards selectivity.

EXAMPLE 2

Influence of the concentration of the complexing agent in the organic phase 1 volume of a neutral chloride solution containing 137 g./l. of Ni and 70 g./l. of Co having a weight ratio Ni/Co substantially equal to 2 and a concentration of 7 gram equivalents of chlorine ions/liter is contacted in a decanting vessel, with 2 volumes of an organic solution of the same sulfonium compound as in Example 1 dissolved in butyl acetate with respective concentrations of 0.3, 0.4 and 0.5 mole/liter. It is agitated for 1 minute and is left to decant. The two phases are separated, recovered and analyzed, the results of extraction being given in Table II hereunder:

TABLE II

| Concentration of sulfonium derivative in butyl acetate | Selectivity of passage of metal in organic phase weight of cobalt/ weight of nickel | Capacity (g. of Co to kg. of active material |
|---|---|---|
| 0.3M | 40 | 52 |
| 0.4M | 12 | 48 |
| 0.5M | 7 | 32 |

It will be clear that when the concentration of the complexing agent increases in the organic phase, the selectivity of the sulphonium composition relative to the cobalt decreases appreciably. The same goes for the capacity of absorption expressed in weight of cobalt retained per kg of active material employed.

EXAMPLE 3

Influence of the concentration of the solution to be purified

Examples 1 and 2 show that the optimal concentration of the complexing agent dissolved in butyl acetate is of the order of 0.3 mole/liter. For this concentration of 0.3M of the same sulfonium derivative there is varied the concentration of the salt solution to be purified, constituted by a mixture of Ni Cl$_2$ and Co Cl$_2$, with a weight ratio of Ni/Co = 1.7 with Cl$^-$ ion concentrations between 5.5 to 9.5 gram equivalents/liter. During extraction the volumetric ratio is equal to 3. Table III hereunder sets out the results of the extraction.

TABLE III

| Concentration of aqueous solution treated (in equivalents chlorine ions/liter | Metallic valuables passed into the organic phase weight of cobalt/ weight of nickel | Capacity (g. of Co per kg. of active material |
| --- | --- | --- |
| 5.5 | 1.6 | 20 |
| 6.3 | 2 | 28 |
| 7.3 | 15 | 45 |
| 7.9 | >1000 | 53 |
| 8.8 | >1000 | 56 |
| 9.5 | >1000 | 62 |

It will be clear that the concentration of salts, expressed in chlorine ions, is a determining factor. Indeed, the selectivity increases very rapidly with this concentration and, in the conditions of Example 3, becomes excellent for an amount of Cl$^-$ above 7 equivalents/liter.

EXAMPLE 4

Influence of the weight ratio Ni/Co on the selectivity of the extraction

There is used a solution of the same sulfonium derivative in butyl acetate with a concentration of 0.3 mole/liter with a volumetric ratio equal to 2. The weight ratio Ni/Co is varied in salt solution composed of a mixture of Co Cl$_2$ + Ni Cl$_2$ having a constant concentration of chlorine ions of 7 gram equivalents/liter.

Table IV hereunder gives the results of the extraction:

TABLE IV

| weight ratio Ni/Co in treated aqueous solution | Metallic valuable passed into the organic phase weight of cobalt/ weight of nickel | Capacity (g. of Co per kg. of active material |
| --- | --- | --- |
| 0 | >1000 | 66 |
| 0.5 | >1000 | 60 |
| 2 | 40 | 51 |
| 6 | 5 | 42 |

It will be clear that the selectivity diminishes proportionately to the increase of the weight ratio Ni/Co in the treated solution. The inflexion threshold of selectivity with respect to the cobalt is between the weight ratios Ni/Co equal to 2 and to 6.

EXAMPLE 5

Influence of volumetric ratio $\frac{\text{organic phase}}{\text{aqueous phase}}$ The solution of Example 3 is taken, the weight ratio being 1.7 and the concentration in Cl$^-$ being brought to 7 gram equivalents/liter. One varies essentially the volumetric proportion between the organic phase and the aqueous phase, the concentration in the organic phase being maintained at 0.3 mole/liter. The volumetric ratios between the phases have been studied for the values between 2 and 8. Table V hereunder sets out the results of the extraction:

TABLE V

| Ratio of volumes organic phase/ aqueous phase | Metallic valuables passed into the organic phase weight of cobalt/ weight of nickel | Capacity (g. of Co per kg. of active material) |
| --- | --- | --- |
| 2 | 800 | 55 |
| 3 | 10 | 43 |
| 4 | 6 | 39 |
| 5 | 3 | 31 |
| 8 | 1.4 | 22 |

It can be seen that the selectivity with respect to the cobalt diminishes when the volumetric ratio $$\frac{\text{organic phase}}{\text{aqueous phase}}$$

increases.

EXAMPLE 6

Description of operations for a concentrated separation of Co and Ni in a representative chloride solution of an industrial treatment Sludges, resulting from a preferential precipitation of cobalt from a solution of nickel salt in the course of purification, are entirely dissolved in concentrated hydrochloric acid. The obtained neutral solution contains at a temperature of about 60° C, 178 g./l. of Ni and 101 g./l. of Co, at 9.5 equivalents/liter Cl$^-$.

Taking into account the information given in the abovedescribed examples, this solution is treated in several stages of extraction as indicated in Table VI hereunder. Between each stage of extraction the aqueous phase is brought, by evaporation, to its initial concentration of chlorine ions, this being controlled by a measure of density; the organic phase is washed by water lightly acidified by HCl which has the effect, on the one hand, of liberating cobalt in the form of an aqueous chlorine solution, and, on the other hand, of regenerating the active material contained in the butyl acetate. The organic phase is used anew for the following extraction stage.

Table VI hereunder illustrates the performances of the procedure according to the invention which in as little as six stages permits reduction from 0.57 to 0.0095 of the weight ratio Co/Ni in the nickel-iron solution, 98.3 percent cobalt being extracted in the form of an aqueous solution containing 0.57 percent by weight of nickel calculated relative to the nickel. The seventh stage of extraction further reduces the amount in cobalt of the nickel-iron solution since the weight ratio Co/Ni in the final solution is 0.000625; however this last

TABLE VI

| Extraction stage | Volumetric ratio, organic phase/ aqueous phase | Amount (parts by weight) | | | | Cobalt extracted, percent parts |
| --- | --- | --- | --- | --- | --- | --- |
| | | Aqueous phase | | Organic phase | | |
| | | Nickel | Cobalt | Nickel | Cobalt | |
| Start | | 213 | 121 | | | |
| 1st | 3 | 213 | 88.49 | 0.00 | 32.51 | 26.9 |
| 2nd | 3 | 212.75 | 58.35 | 0.25 | 30.14 | 24.9 |
| 3rd | 2 | 212.75 | 39.38 | 0.00 | 18.97 | 15.7 |
| 4th | 2 | 212.65 | 23.02 | 0.10 | 16.36 | 13.5 |
| 5th | 2 | 212.37 | 8.39 | 0.28 | 14.63 | 12.1 |
| 6th | 1 | 212.32 | 2.02 | 0.05 | 6.37 | 5.2 |
| Total parts | | | | 0.68 | 118.98 | 98.3 |
| 7th | 1 | 207.86 | 0.13 | 4.46 | 1.89 | 1.6 |
| Total | | | | 5.14 | 120.87 | 99.9 | result has been attained to the detriment of the purity of the cobalt-iron solution corresponding to this seventh stage. This does not represent an inconvenience since the organic phase containing cobalt soiled with nickel can be recycled without inconvenience to the first stage of extraction : during the latter the nickel is displaced by the cobalt contained in the initial raw solution to be purified.

By the analysis of di - sec ($C_{10}$, alkyl)-methyl - sulfonium chloride in the regenerated organic phase, it can be seen that the losses by entrainment in the aqueous solutions or by degradation have been very small, less than 0.05 kg for a kg extracted of cobalt.

It will be evident to those skilled in the art that this technique is perfectly suitable for counter-current liquid/liquid extraction processes which allow equivalent performances with a limited number of extraction stages.

What is claimed is:

1. In a process for the separation of metallic impurities from aqueous industrial nickel chloride solutions, by selective liquid/liquid extraction between said aqueous phase containing the said metallic impurities in chloride form and an organic phase containing a trialkylsulfonium chloride in the form of a solution in an organic diluent substantially immiscible with water, such that at least one of the said metallic impurities is selectively transferred from the aqueous phase to the organic phase, the improvement which comprises the said aqueous phase being substantially neutral and having a total concentration in chlorine ions equal at least 7 gram-equivalents/liter.

2. A process according to claim 1, wherein the improvement further comprises an organic diluent comprising a non-polar and relatively light solvent containing no chlorine atoms.

3. A process according to claim 2, wherein said organic diluent is selected from the group consisting of alcohol esters, ether-oxides and ketones.

4. A process according to claim 3, wherein said organic diluent is selected from the group consisting of butyl acetate, amy acetate, hexylacetate, butyl propionate, amyl propionate, hexyl propionate, methyl-isopropyl ketone, methyl-isobutyl ketone, di-isobutyl ketone, and butyl oxide.

5. A process according to claim 3, wherein the organic diluent is butyl acetate.

6. A process according to claim 1, which is arranged to be continuously operated, the organic phase used for the selective extraction of the aqueous solution being regenerated by being placed in contact with a second aqueous phase selected from water and water acidified by hydrochloric acid, and used for a new extraction.

7. A process according to claim 6, applied to the separation of cobalt chloride from nickel chloride aqueous solutions and operated in a multi-stage operation providing several distinct organic phases, said second aqueous phase being used for the successive regeneration of said distinct organic phases until the concentration of cobalt chloride in the said second aqueous phase reaches 130 grams per liter.

8. A process according to claim 1, wherein the tri-alkylsulfonium chloride conforms to the formula

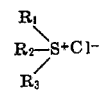

wherein $R_1$ is a $CH_3$ radical and $R_2$ and $R_3$ are alkyl radicals of from seven to 13 carbon atoms.

* * * * *

UNITED STATES PATENT OFFICE
CERTIFICATE OF CORRECTION

Patent No. 3,660,020  Dated May 2, 1972

Inventor(s) LOUIS GANDON ET AL.

It is certified that error appears in the above-identified patent and that said Letters Patent are hereby corrected as shown below:

In the heading of the patent, item [30], the French priority application should be correctly identified as application number 6927701 rather than 6922701.

Signed and sealed this 19th day of November 1974.

(SEAL)
Attest:

McCOY M. GIBSON JR.
Attesting Officer

C. MARSHALL DANN
Commissioner of Patents